United States Patent [19]
Knowles

[11] Patent Number: 5,905,251
[45] Date of Patent: May 18, 1999

[54] HAND-HELD PORTABLE WWW ACCESS TERMINAL WITH VISUAL DISPLAY PANEL AND GUI-BASED WWW BROWSER PROGRAM INTEGRATED WITH BAR CODE SYMBOL READER IN A HAND-SUPPORTABLE HOUSING

[75] Inventor: Carl Harry Knowles, Morristown, N.J.

[73] Assignee: Metrologic Instruments, Inc., Blackwood, N.J.

[21] Appl. No.: 08/891,599

[22] Filed: Jul. 11, 1997

Related U.S. Application Data

[63] Continuation of application No. 08/753,367, Nov. 25, 1996, abandoned, which is a continuation-in-part of application No. 08/645,331, May 13, 1996, Pat. No. 5,844,227, application No. 08/615,054, Mar. 12, 1996, application No. 08/573,949, Dec. 18, 1995, application No. 08/292,237, Aug. 17, 1994, Pat. No. 5,808,285, application No. 08/365,193, Dec. 28, 1994, Pat. No. 5,557,093, application No. 08/293,493, Aug. 19, 1994, Pat. No. 5,525,789, application No. 08/561,479, Nov. 20, 1995, Pat. No. 5,661,292, application No. 08/278,109, Nov. 24, 1993, Pat. No. 5,484,992, application No. 08/489,305, Jun. 9, 1995, abandoned, application No. 08/476,069, Jun. 7, 1995, Pat. No. 5,591,953, and application No. 08/584,135, Jan. 11, 1996, Pat. No. 5,616,908.

[51] Int. Cl.⁶ ............................................. G06K 7/10
[52] U.S. Cl. .............................. 235/472.01; 235/462.01
[58] Field of Search ............................... 235/454, 462, 235/472, 375, 494

[56] References Cited

U.S. PATENT DOCUMENTS

| | | |
|---|---|---|
| 4,654,482 | 3/1987 | DeAngelis . |
| 4,841,132 | 6/1989 | Kajitani et al. . |
| 5,157,687 | 10/1992 | Tymes et al. ............................ 375/1 |

(List continued on next page.)

FOREIGN PATENT DOCUMENTS

| | | |
|---|---|---|
| 0 744 856 A2 | 11/1996 | European Pat. Off. . |
| 0 837 406 A2 | 4/1998 | European Pat. Off. . |
| WO97/01137 | 1/1997 | WIPO . |
| WO97/38389 | 10/1997 | WIPO . |
| WO98/06055 | 2/1998 | WIPO . |
| WO98/09243 | 3/1998 | WIPO . |
| WO98/19259 | 5/1998 | WIPO . |
| WO98/20411 | 5/1998 | WIPO . |

OTHER PUBLICATIONS

U.S. application No. 08/691,263, Swift et al., filed Aug. 2, 1996.

IRIS IRISPen, a review of scanners published in MacUser, pp. 54–55, published Jul. 1998.

(List continued on next page.)

*Primary Examiner*—Donald Hajec
*Assistant Examiner*—Thien Minh Le
*Attorney, Agent, or Firm*—Thomas J. Perkowski

[57] ABSTRACT

A portable hand-held WWW access terminal for accessing HTML-encoded documents located on the WWW. The terminal includes a bar code symbol reader in a hand-supportable housing for reading URL-encoded symbols specifying the location of HTML-encoded documents stored in information servers connected to the Internet and supporting the TCP/IP standard. A computing platform is provided for supporting a GUI-based WWW browser program integrated with the bar code symbol reader in the hand-supportable housing. A telecommunication modem is operably connected to the computing platform in order to establish a two-way telecommunication link between the GUI-based WWW browser and an Internet service provider (ISP) connected to the Internet. In response to reading a URL-encoded bar code symbol, the WWW browser program automatically accesses a corresponding HTML-encoded document on the Internet, for display on a visual display panel integrated with hand-supportable housing. A keypad is also integrated with the hand-supportable housing for manually providing information to the WWW browser program.

30 Claims, 4 Drawing Sheets

U.S. PATENT DOCUMENTS

| | | |
|---|---|---|
| 5,280,498 | 1/1994 | Tymes et al. .................... 375/1 |
| 5,288,976 | 2/1994 | Citron et al. . |
| 5,483,052 | 1/1996 | Smith, III et al. . |
| 5,490,217 | 2/1996 | Wang et al. .................... 235/462 |
| 5,600,833 | 2/1997 | Senn et al. .................... 395/601 |
| 5,635,694 | 6/1997 | Tuhro .......................... 235/375 |
| 5,640,193 | 6/1997 | Wellner ........................ 348/7 |

OTHER PUBLICATIONS

Press Release "AllPen Software Announces NetHopper at PC Expo," by S & S Public Relations, published Jun. 18, 1998.

Product Bruchure for NetHopper 2.0 WWW Browser Program for the Newton 2.0 Operating System, by AllPen Software, Inc., 2 pages, published circa 1997.

Magazine Guides That Help the Surfers, article from New York Times, P. D–7, published Nov. 25, 1996.

International Search Report in International Application No. PCT/US97/21975 Jun. 4, 1998.

International Search Report in International Application No. PCT/US97/21443 Jun. 4, 1998.

International Search Report in International Application No. PCT/US97/21970 Jun. 4, 1998.

HAND-HELD PORTABLE WWW ACCESS TERMINAL WITH VISUAL DISPLAY PANEL AND GUI-BASED WWW BROWSER PROGRAM INTEGRATED WITH BAR CODE SYMBOL READER IN A HAND-SUPPORTABLE HOUSING

RELATED CASES

This Application is a Continuation of application Ser. No. 08/753,367 filed Nov. 25, 1996 now abandoned, which is a Continuation-in-Part of: application Ser. No. 08/645,331 filed May 13, 1996 now U.S. Pat. No. 5,844,277; copending application Ser. No. 08/615,054 filed Mar. 12, 1996; copending application Ser. No. 08/573,949 filed Dec. 18, 1995; application Ser. No. 08/292,237 filed Aug. 17, 1994, now U.S. Pat. No. 5,808,285; application Ser. No. 08/365,193 filed Dec. 28, 1994 now U.S. Pat. No. 5,557,093; application Ser. No. 08/293,493 filed Aug. 19, 1994 now U.S. Pat. No. 5,525,789; application Ser. No. 08/561,479 filed Nov. 20, 1995 now U.S. Pat. No. 5,661,292; application Ser. No. 08/278,109 filed Nov. 24, 1993 now U.S. Pat. No. 5,484,992; application Ser. No. 08/489,305 filed Jun. 9, 1995 now abandoned; Ser. No. 08/476,069 filed Jun. 7, 1995 now U.S. Pat. No. 5,591,953; and application Ser. No. 08/584,135 filed Jan. 11, 1996 now U.S. Pat. No. 5,616,908. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention is directed to a novel Internet scanning terminal and a novel method for surfing Internet World Wide Web (WWW) using bar code symbols encoded with the Uniform Resource Locators (URLs) indicating the location of Web-Sites within the WWW to be explored.

2. Background of the Invention

Presently, several techniques have been developed for connecting to (i.e., "surfing" among) Internet Web-sites using a conventional graphical user interface (GUI) based Internet browser programs, such as the Navigator® from Netscape Communications, Inc. or the Internet Explorers from Microsoft, Inc. Notably, the availability of any particular Web-site surfing technique depends, of course, on where the Internet user finds him or her self in the Internet browser program at any particular instant of time.

For example, if one is currently at a Web-site (i.e., in a particular HyperText Markup Language (HTML) document), at which there is a highlighted "link" or embedded URL specifying the Internet address of another Web-site (i.e., another HTML document), then the user can "surf to" this other Web-site by simply "clicking on" or selecting the highlighted URL with his or her pointing device (i.e., "mouse") in a conventional manner. The ability to connect to other Web-sites by simply pointing and clicking on a highlighted URLs embedded in an HTML document has contributed enormously to the growth and popularity of the Internet in the last few years.

If the user desires to connect to a Web-site that is not referenced in a HTML document viewed through a browser program, then the user oftentimes find it necessary to manually enter the URL of the Web-site (e.g., "http://www.metrologic.com") into the browser program. This requires manually pressing a sequence of keys on a keyboard or remote control device, corresponding to the characters of the URL being selected. In addition to being time consuming, this Web-site surfing technique is prone to errors, causing the browser program to connect to the wrong Web-site or return a message stating that the Domain Name of the Web-site sought after cannot be found. From practical point of view, this is quite frustrating to the Internet user.

More recently, with the growth and ever increasing complexity of the WWW, it is becoming popular to use printed publications (e.g. magazines, catalogues, directories, etc.) which list Web-site, corresponding URLs and content descriptions, as navigational aids, much in same way that the TV GUIDE® magazine is used to help viewers select programs during television viewing. Again, however, each time a listed Web-site is to be viewed, the user is forced to manually enter into the Internet browser program, the lengthy character string associated with the URL of the Web-site being selected. Only thereafter, does the browser program automatically connect the user's client system (i.e., Internet Terminal) to the Internet information serving computer supporting the selected Web-site.

While the development of HTML and GUI-based Web browser programs have made accessing Web-sites quite simple, the above shortcomings and drawbacks of prior art Internet technology clearly indicate a great need in the art for an improved system and method of surfing to Web-sites on the Internet.

OBJECTS AND SUMMARY OF THE PRESENT INVENTION

Accordingly, it is a primary object of the present invention to provide an improved system and method of surfing Web-sites on the Internet while avoiding the shortcomings and drawbacks of prior art systems and methodologies.

A further object of the present invention is to provide an Internet Scanning System, which includes an bar code symbol reader programmed to read URL-encoded bar code symbols printed on various types of print media which, when read thereby, automatically connects the Internet Client System to the Internet Server that supports the Web-site specified by the scanned URL-encoded bar code symbol.

A further object of the present invention is to provide such Internet Scanning System, wherein the bar code symbol reader may be a laser scanning bar code symbol reader, a CCD bar code symbol, or a Wand-type bar code symbol reader.

A further object of the present invention is to provide such an Internet Scanning System, wherein the URL-encoded bar code symbol printed on various types of print media is a URL-encoded truncated-type bar code symbol, having a very low height to length ratio, thereby allowing many URL-encoded bar code symbols to be printed on a single sheet or page of a Web-site guide, along with their corresponding human-readable URLs and content descriptions.

Another object of the present invention is to provide such an Internet Scanning System in the form of a desktop, laptop or palmtop computer system that is connected to the Internet by way of an Internet Service Provider (ISP), wherein the computer system has a GUI-based web browser program and a programmed bar code symbol scanner interfaced therewith for automatically surfing to Web-sites listed in a Web-site guide by simply scanning corresponding URL-encoded bar code symbols printed on the pages thereof.

A further object of the present invention is to provide an Internet Scanning System in the form of an interactive web-based television system, wherein the web-based television system comprises a Internet terminal unit connected to the Internet by way of an ISP, an audio-visual display monitor for displaying graphical and audio information content of Web-sites, and a portable Internet surfing device having a wireless IR-based communication link to the Internet terminal unit and an integrated bar code symbol scanner for automatically surfing to (or among) Web-sites listed in a Web-site guide by simply scanning corresponding URL-encoded bar code symbols printed on the pages thereof.

A further object of the present invention is to provide such an Internet Scanning System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed bar code symbol scanner for automatically surfing to Web-sites listed in a Web-site guide by simply scanning corresponding URL-encoded bar code symbols printed on the pages thereof.

Another object of the present invention is to provide a novel method of surfing to Web-sites on the Internet by scanning URL-encoded bar code symbols into GUI-based web browser programs, without the need of manual data entry operations or the like.

A further object of the present invention is to provide an Internet Scanning System, which includes an optical character reader programmed to read the character strings of URLs printed on various types of print media which, when read thereby, automatically connects the Internet Client System to the Internet Server that supports the Web-site specified by the read URL.

Another object of the present invention is to provide such an Internet Scanning System in the form of a desktop, laptop or palmtop computer system that is connected to the Internet by way of an Internet Service Provider (ISP), wherein the computer system has a GUI-based web browser program and a programmed optical character reader interfaced therewith for automatically surfing to Web-sites listed in a Web-site guide by simply reading corresponding URLs printed on the pages thereof.

A further object of the present invention is to provide an Internet Scanning System in the form of an interactive web-based television system, wherein the web-based television system comprises a Internet terminal unit connected to the Internet by way of an ISP, an audio-visual display monitor for displaying graphical and audio information content of Web-sites, and a portable Internet surfing device having a wireless IR-based communication link to the Internet Terminal unit and an integrated optical character reader for automatically surfing to Web-sites listed in a Web-site guide by simply scanning corresponding URLs printed on the pages thereof.

A further object of the present invention is to provide such an Internet Scanning System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed optical character reader for automatically surfing to Web-sites listed in a Web-site guide by simply scanning corresponding URLs printed on the pages thereof.

Another object of the present invention is to provide a novel method of surfing to Web-sites on the Internet by optically scanning the character strings of URLs into GUI-based web browser programs, without the need of manual data entry operations and the like.

Another object of the present invention is to provide a novel Web-site guide or directory comprising one or more sheets having a plurality of URL-encoded bar code symbols, corresponding human-readable URLs and Web-site content descriptions printed thereon.

These and other objects of the present invention will become apparent hereinafter.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein.

DETAILED DESCRIPTION OF THE ILLUSTRATIVE EMBODIMENTS OF THE PRESENT INVENTION

Figure 1:
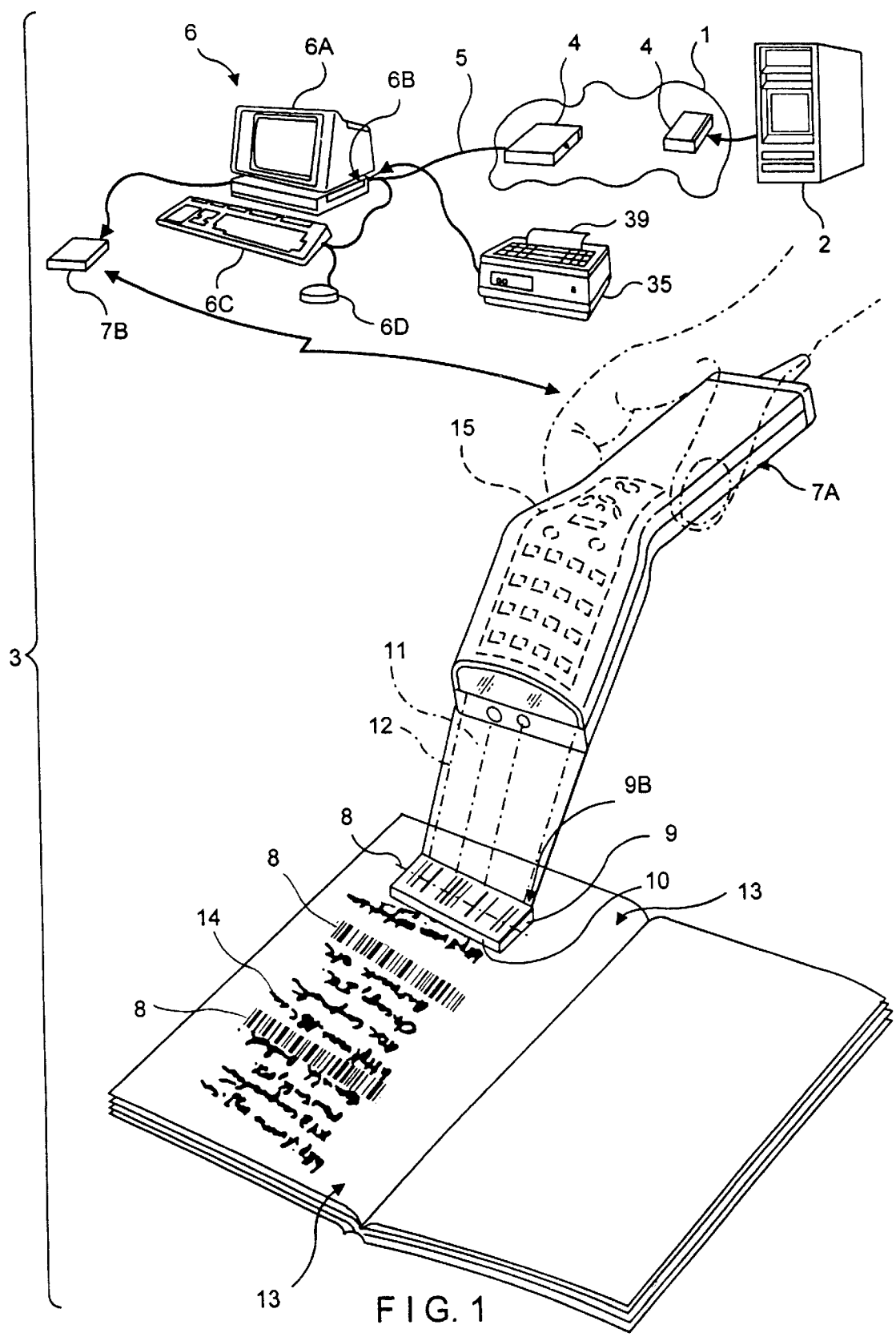
FIG. 1 is a schematic diagram of the first illustrative embodiment of the present invention, in which the Internet Scanning System hereof is realized in the form of a desktop computer system shown connected to the Internet by way of an ISP, and having a GUI-based web browser program and a bar code symbol scanner for automatically surfing to Web-sites listed in a Web-site guide by simply scanning corresponding URL-encoded bar code symbols printed on the pages thereof.

The illustrative embodiments of the present invention will be described with reference to the figure drawings wherein like elements and structures are indicated by like reference numbers.

In general, the system and method of the present invention is practiced in connection with a globally-based digital telecommunications network (known as the Internet). The function of the Internet is to provide an infrastructure that supports wired and wireless digital telecommunications throughout the world using the well known TCP/IP networking protocols. In general, the Internet infrastructure comprises Internet Service Providers (ISPs), Network Service Providers (NSPs), routers, telecommunication lines and channels. etc., all well known in the art.

Connected to the Internet 1 by way of the Internet infrastructure (i.e., ISPs and NSPs) are many Internet Web-site Servers (i.e., computer systems) 2 that are physically located throughout the world and whose function is to serve information to Internet users when requested by client computer systems (i.e., client systems) 3. In general, each Internet Web-site Server 2 and client system 3 may be connected to the infrastructure by way of an ISP 4 (or NSP) using physical communication media or a wireless (RF-based) digital communication link 5 well known in the art. Notably, while each illustrative embodiment of the Internet Scanning System hereof is realized in the form of a Client System operably connected to the infrastructure of the Internet by way of an ISP, it is understood that the Internet connection may be achieved through an NSP or access point in the Internet infrastructure.

In the illustrative embodiments, each Internet Web-site Server 2 is realized as a computer system running conventional Web-site server software (e.g., WebStar® from StarNine, Inc.) and is interfaced with an ISP in a conventional manner. Each Internet Web-site Server is assigned an unique IP address (and Domain Name) on the Internet, and is provided with Internet networking software to support the TCP/IP protocol. In addition, each Internet Web-site server is provided with one or more application software programs for creating and maintaining hypermedia documents containing text, graphics and audio information within an information file structure expressed in HTML. Each HTML document on the WWW is physically stored in an Internet Server 2. The location of such information storage on the WWW is specified by a Uniform Resource Locator (URL), the syntax of which is well known in the art. The function of a URL is best illustrated by way of example. Metrologic Instruments, Inc., the assignee of the present invention, has launched a WWW site having a "home page" (i.e., first page) specified by the following URL: "http://www.metrologic.com". The type of information maintained at this Web-site, beginning with Metrologic's home page, can be virtually any type of information (of a multi-media nature) and typically will be updated over time to reflect changes in either the company, its products, services and the like. The same is generally true for each and every other Web-site on the Internet, regardless of the type of information being served to client systems.

As illustrated in FIG. 1, the first illustrative embodiment of the Internet Scanning System hereof is realized in the form of a desktop computer system 6. As shown, the desktop computer system consisting of a video monitor 6A, a processor 6B, keyboard 6C and mouse 6C, is connected to the Internet by way of an ISP 4. The computer system 6 has a GUI-based web browser program and a hand-held, wireless laser scanning bar code symbol reading system 7 which is connected to the communication port of this host system in a conventional manner. In the preferred embodiment, wireless bar code symbol reading system 7 comprises a hand-supportable laser scanning bar code symbol reading device 7A and a base unit 7B which receives RF signals transmitted from device 7A upon the successful reading of each bar code symbol thereby; the base unit 7B produces an acoustical acknowledgement signal in response to each such successful read. System 7 can be realized by any one of the (i) wireless bar code symbol reading systems disclosed in copending application Ser. No. 08/292,237 filed Aug. 17, 1994, or (ii) tethered bar code symbol reading systems disclosed in copending application Ser. Nos. 08/476,069 and 08/660,643, each said application being incorporated herein by reference. The function of the programmed bar code symbol reader 7 is to read a bar code symbol 8 that is encoded with the URL of a Web-site to be accessed by the Internet Scanning System, and produce symbol character data representative of the URL. As used hereinafter, this special type of bar code symbol shall be referred to as a "URL-Encoded Bar Code Symbol". The information structure of this symbol character string should be formatted so that it corresponds to the syntactical structure of the URL and is thus readily utilizable by any conventional GUI-based Internet browser program, such as the Navigator® from Netscape or the Internet Explorer® from Microsoft. When this URL information is provided to the Internet browser program, the particular Web-site corresponding to the URL is automatically accessed by the Internet Scanning System.

In general, each URL-encoded bar code symbol of the present invention can be either a linear (1-D) or 2-D bar code symbol structure of virtually any symbology that allows for the encoding of the ASCII-type information contained within a URL-type information structure, the syntax of which is well known in the art. In the preferred embodiment, the URL-Encoded Bar Code Symbol 8 is realized as a truncated-type bar code symbol of Code 128 or Code 39 Symbology. Preferably, each such bar code symbol is printed above, below or alongside each Web-site URL 14 or its listing in a Web-site guide or directory. In general, the URL-encoded bar code symbol can be of any length. Notably, the advantage of using the truncated bar code symbol structure is that the height of the bars and spaces is relatively short in relation to the length of the bar code, thus allowing the URL-encoded truncated Symbol 8 to be easily printed with each Web-site listing printed on crowded pages of printed Web-site guides and catalogues, as illustrated in FIG. 1A.

In accordance with the present invention, Web-site listings in which URL-encoded bar code symbols may be printed, include various types of printed guides, directories or publications which digest, catalogue, organize or otherwise list WWW sites that exist on Web-site Servers throughout the Internet. Examples of such printed Web-site publications include, for example: the "WWW Yellow Pages" (1996) published by the New Riders Publishers, Inc.; "PC NOVICE GUIDE TO THE WEB: How to find anything on the Web" (1996) published by Peed Corporation; "Cybersurfer", published by Starlog Group, Inc.; "Internet Underground", published by Ziff-Davis; "Internet User", published by Ziff-Davis; "Internet World", published by Mecklermedia; "The Net", published by Imagine Publishing; "Net Guide", published by CMP Media; "Online Access", published by Red Flash Internet; "The Web", published by International Data Group; "Websight", published by New Media, Inc.; "Yahoo Internet Life", published by Ziff-Davis and Yahoo; WebTV Guides; or any other printed publication that one may desire to use to look up Web-sites (of interest) that one would like to visit (surf to) and explore.

Figure 1A:
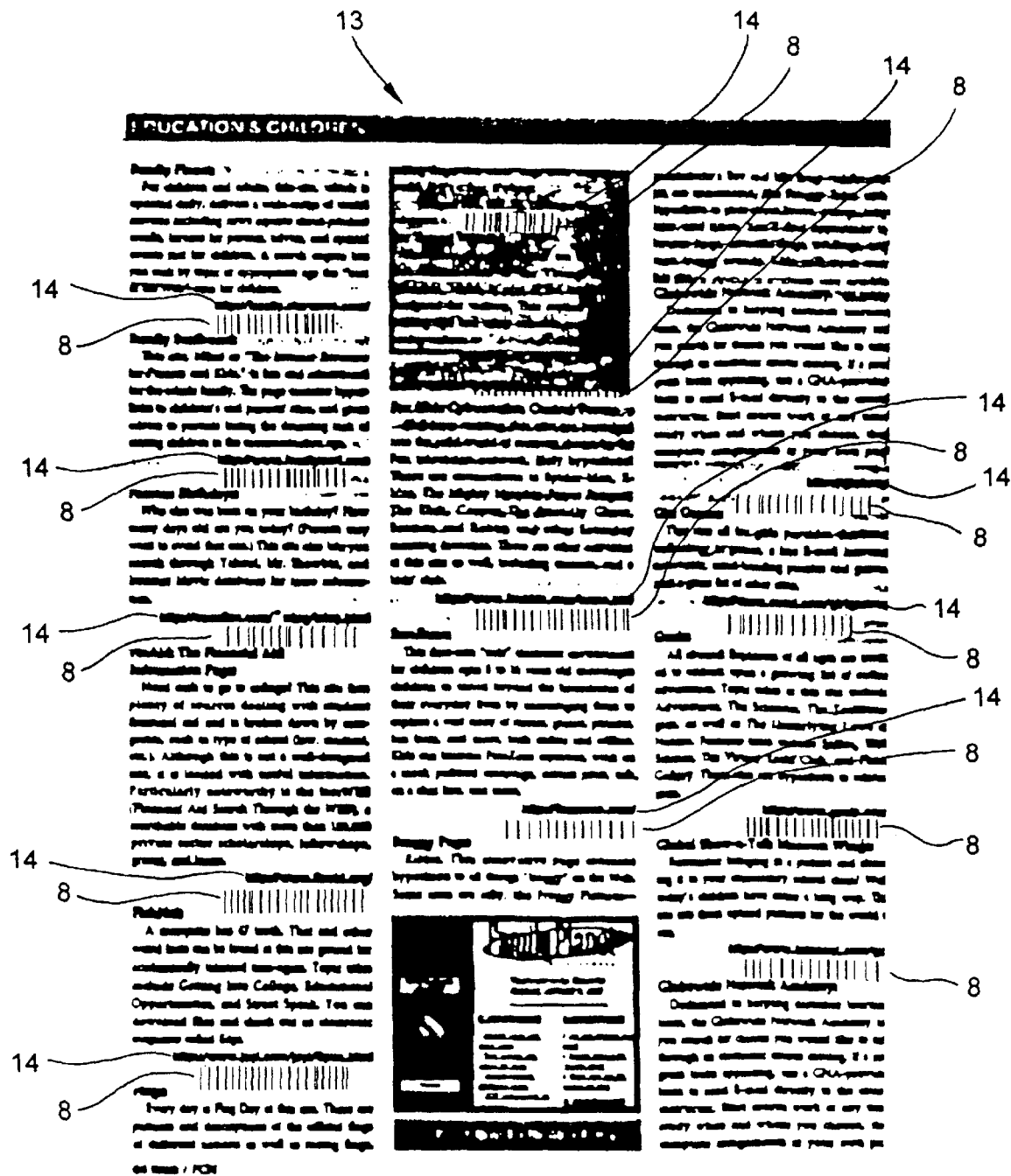
FIG. 1A is schematic representation of a single sheet or page of the Web-site Directory of the present invention, showing several URL-encoded (truncated) bar code symbols printed thereon along with their corresponding human-readable URLs and content descriptions.

As shown in FIGS. 1 and 1A, the programmed bar code symbol scanner 7 of the Internet Scanning System of the first illustrative embodiment is particularly designed so that closely nested Web-site listings on a single page can be read without inadvertently reading undesired URL-encoded bar code symbols. This added scanning control feature is achieved in the bar code symbol reader of FIG. 1 by providing the automatic laser scanning bar code symbol reader 7A with an optically-transparent scanning plate 9A supported from reader 7A by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. In this particular embodiment of the bar code symbol reader 7A, the IR-based object detection field 11 extends just slightly beyond the sighting window 10 so that the laser scanning by laser beam 12 is automatically initiated only when an object (e.g., Web-site Guide) 13 is placed up against the sighting window 10, as when the scanning plate is brought in contact with URL-Encoded Bar Code Symbol 8 associated with a particular Web-site listing, shown in FIG. 1A. The design and construction details associated with automatic bar code symbol reader 7A can be found in Applicant's prior U.S. application Ser. No. 08/292, 237 filed Aug. 17, 1994, incorporated herein by reference. As shown in FIG. 1, this scanning device can be provided with a keypad 15 in a manner known in the art, for manually entering the characters of URLs, needed or required.

Figure 2:
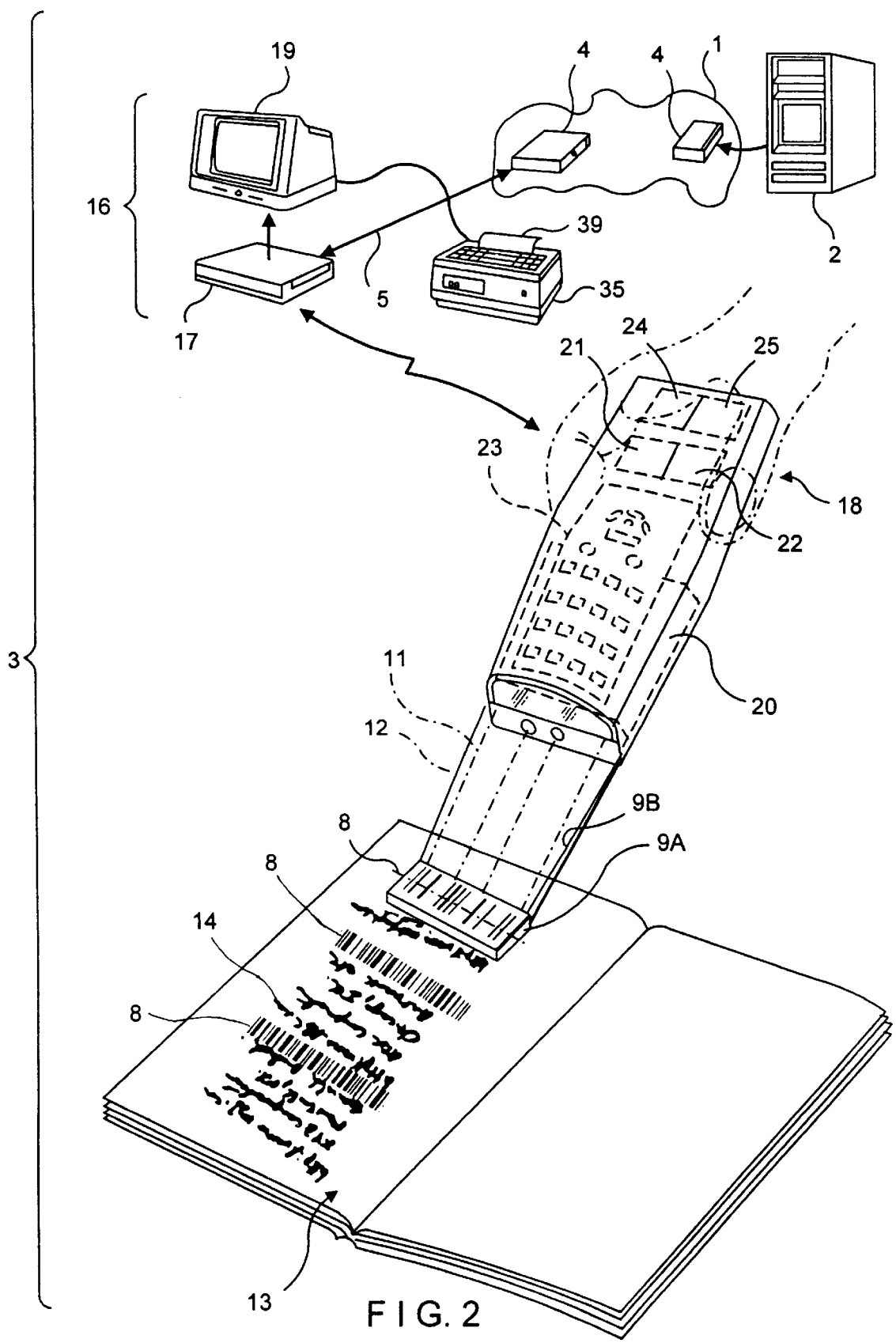
FIG. 2 is a schematic diagram of the second illustrative embodiment of the present invention, in which the Internet Scanning System hereof is realized in the form of an interactive web-based television system which comprises a Terminal Unit shown connected to the Internet by way of an ISP and has portable Internet Navigation (i.e., Surfing) Device having an IR-link to the Terminal Unit, and a bar code symbol scanner integrated therewith for automatically surfing to Web-sites listed in a Web-site guide by simply scanning corresponding URL-encoded bar code symbols printed on the pages thereof.

As shown in FIG. 2, the second illustrative embodiment of the Internet Scanning System hereof is realized in the form of an interactive web-based television system 16 which comprises an Internet Terminal Unit 17, a Remote Control Scanning Device 18 and a standard (NTSC or PAL) color television set 19. As shown, the Internet Terminal Unit 17 is connected to the Internet by way of an ISP 4 and includes means for supporting: (i) a GUI-based Internet browser program such as the Internet Navigator® from Netscape Communications or the Internet Explorer® from Microsoft, Inc.; and (ii) the TCP/IP networking protocol on the Internet. In the preferred embodiment, the Internet Terminal Unit 17 can be realized using any one of a number of commercially available Internet Terminal devices, such as, for example: the Mediamaster 9500™ Internet Terminal from Nokia, Inc.; the NetStation™ Internet Terminal from Acorn Computer; or the "Internet Digital Appliance" from Diba.

As shown in FIG. 2, the Remote Control Scanning Device 18 of the second illustrative embodiment can be realized by integrating a miniature automatic bar code symbol reading module 20 into the wireless remote control device that is provided with the commercially available terminal unit that is used to practice this embodiment of the present invention. Preferably, automatic bar code symbol reading module 20 is similar to the device described in great detail in Applicant's copending application Ser. No. 08/292,237 supra. Such laser scanning engines, as they are called, are commercially available from Metrologic Instruments, Inc., of Blackwood, N.J., under the tradename ScanQuest®. The manner in which such a laser scanning engine can be integrated into any one of the remote control devices of the above-identified Internet Terminals, and thus provide the Remote Control Scanning Device 18, will be described below.

The Mediamaster 9500™ Internet Terminal from Nokia, Inc., the NetStation™ Internet Terminal from Acorn Computer, or the Internet Digital Appliance from Diba, are each provided with a wireless remote control device which includes a programmable microcontroller (i.e., microprocessor) operably connected to a system bus of one sort or another. The system subcomponents that are connected to the system bus structure include, for example: program memory realized in the form of EPROM 21; data storage memory realized in the form of RAM 22; a keypad 23, data storage registers and interface circuitry; an IR-based communication circuit and interface circuitry 24; and a power supply and power distribution circuitry 25. In such commercial products, no visual display device (e.g. LCD panel) is provided, as all display functions are provided on the television screen using an on-screen display format well known in the art. Integration of an automatic ScanQuest® Laser Scanning Module (Model No. IS4120) into the system architecture of such wireless remote control devices can be achieved by adding additional data registers to the system bus, and connecting the data output port of the scanner to such registers in a conventional manner. Additional control logic will have to be provided by the microcontroller in to provide scan data from the scanner priority over data entered manually into the system. All such modifications are within the ordinary skill in the art.

As shown in FIG. 2, Remote Control Scanning Device 18 has an optically-transparent scanning plate 9A supported by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. The IR-based object detection field 11 extends just slightly beyond the sighting window 10 so that the laser scanning beam 12 is automatically initiated only when an object (e.g., Web Guide) 13 is placed up against the sighting window 10, as when the scanning plate 10 is brought in contact with URL-Encoded Bar Code Symbol 8 associated with a particular Web-site listing, shown in FIG. 2. During operation, the Remote Control Scanning Device 18 is used to read URL-encoded bar code symbols 8 printed on Web-site GuideBook 13 in order to connect to the corresponding Web-sites thereof.

While any standard (NTSC or PAL) color television set can be used in connection with the Internet Terminal 17 to display graphical and audio information content associated with any particular Web-site accessed by the system, it is preferred that a higher-resolution (VGA or SVGA) computer monitor is used in connection therewith to display high resolution graphics.

Figure 3:
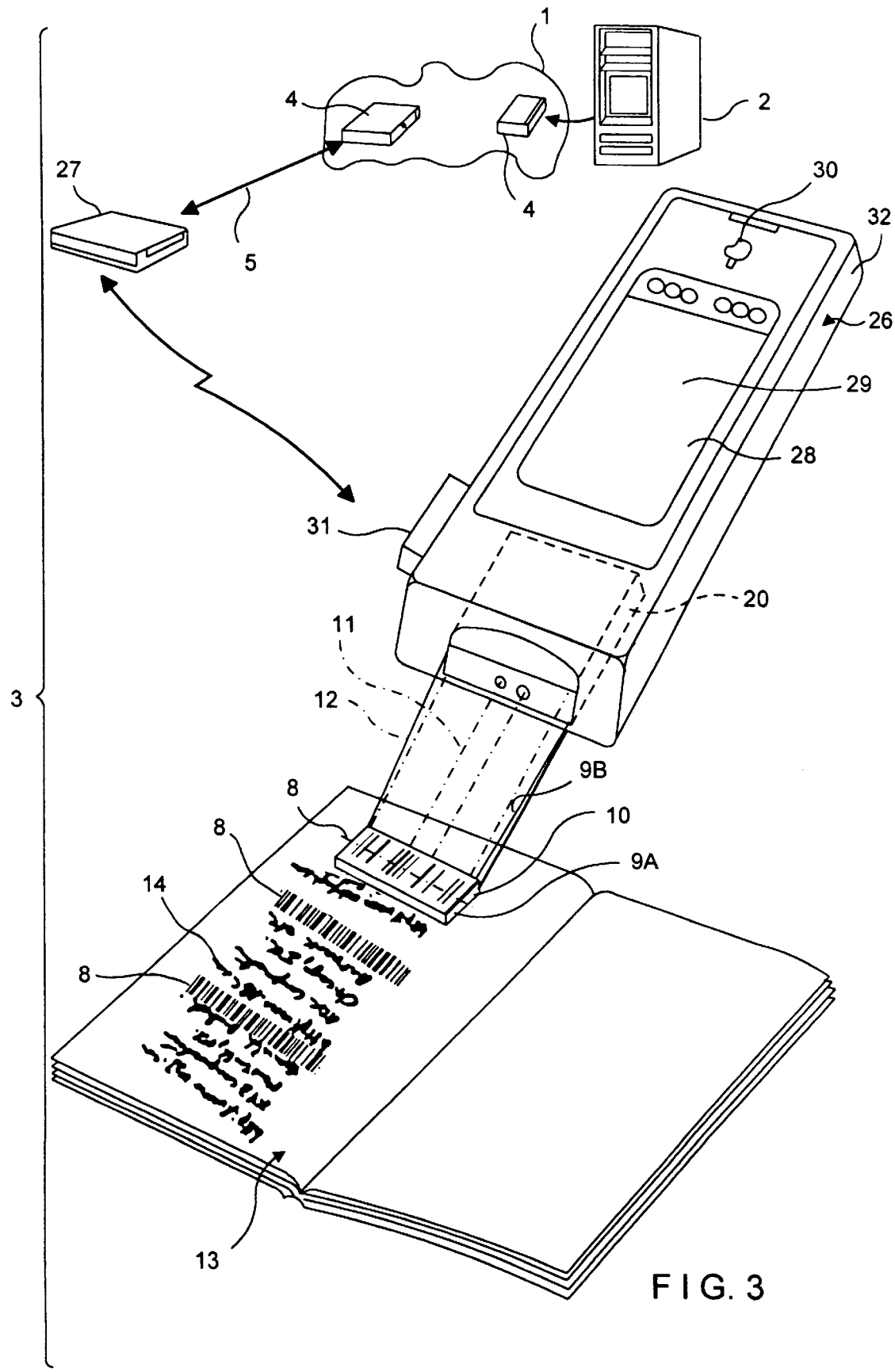
FIG. 3 is a schematic diagram of the third illustrative embodiment of the present invention, in which the Internet Scanning System hereof is realized in the form of a hand-held Scanner Integrated Terminal shown connected to the Internet by way of a wireless link to an ISP, and having an integrated GUI-based web browser program, display panel, keypad, and programmed bar code symbol scanner for automatically surfing to Web-sites listed in a Web-site guide by simply scanning corresponding URL-encoded bar code symbols printed on the pages thereof.

As shown in FIG. 3, the third illustrative embodiment of the Internet Scanning System hereof is realized in the form of a hand-held Scanning Integrated Terminal. The Scanner Integrated Terminal 26 is shown connected to an ISP 4 by way of a radio-base station 27 and wireless link 5. The hand-held Scanning Integrated Terminal 26 has an integrated GUI-based World Wide Web (WWW) browser program, display panel 28, touch-screen type keypad 29, and programmed bar code symbol scanner 20. The function of the bar code symbol scanner 20 is to read a bar code symbol 8 that is encoded with the URL of a Web-site to be accessed by the Internet Scanning System, and produce symbol character data representative thereof.

In the illustrative embodiment, the Scanner Integrated Terminal 26 is realized as a transportable computer, such as the Newton® Model 130 Messagepad 30 from Apple Computer, Inc. of Cupertino, Calif. This device is provided with NetHopper™ brand Internet Access Software from AllPen Software, Inc., of Los Gatos, Calif., which supports the TCP/IP networking protocol and the client-side of HTTP within the Newton MessagePad. The Newton Messagepad is also equipped with a Motorola PCMICA-based modem card 31 having a RF transceiver for establishing a wireless digital communication link with either (i) a cellular base station, or (ii) one or more satellite-base stations (27) connected to the Internet by way of an ISP 4 in a manner well known in the global information networking art. While it is understood that, in some instances, it may be desired to connect a pen or wand device to the serial port of the Newton MessagePad to provide bar code symbol reading capabilities thereto, it is generally preferred that automatic laser scanning engine 20 (e.g., Metrologic ScanQuest® Laser Scanning Module Model No. IS4120), be interfaced with the serial communications port of the Newton MessagePad so as to realize the Internet Scanning System of the third illustrative embodiment hereof.

As shown in FIG. 3, the entire Newton MessagePad, ScanQuest® Laser Scanning Module 20 and auxiliary battery supply (not shown) are completely housed within a rubberized shock-proof housing 32, in order to provide a hand-supportable unitary device. The rubberized housing is provided with an scanning aperture 10 realized within an optically transparent scanning plate 9B supported by extension 9A. The function of the scanning aperture 10 is to allow the projected laser beam to sweep across a URL-encoded bar code symbol 8 located within the sighting window 10 of optically-transparent scanning plate 9B, once the object (e.g., Web-site guide) 13 is detected by the object detection field 11.

In each of the three illustrative embodiments described above, the bar code symbol scanner can be replaced by a programmed optical character reader realized using the automatic holographic laser scanning technology disclosed in great detail in Applicant's copending application Ser. No. 08/ 08/573,949 filed Dec. 18, 1995, incorporated herein by reference. The function of the programmed optical character reader is to allow the Internet Scanning Terminal to access any desired Web-site by reading the alphanumeric character string comprising the URL thereof, and provide the same as output to the GUI-based Internet browser program thereof. In such alternative embodiments, the function of the optical character reader (i.e., character reading module) is to read the SCII characters comprising the URL 14 printed on a Web-site guide or like publication, avoiding the need for manual key entry operations.

The Internet Scanning Terminals of the present invention may be modified, in a variety of ways, to carry diverse range of bar code symbol scanning functions. All modifications and variations of the illustrative embodiments are deemed to be within the scope and spirit of the present invention as defined by the accompanying Claims to Invention.

What is claimed is:

1. A portable WWW access terminal for allowing an operator to access and display HTML-encoded documents located on the WWW by reading bar code symbols encoded with URLs, said portable WWW access terminal comprising:

a hand-supportable housing supportable within the hand of said operator;

a bar code symbol reader, integrated within said hand-supportable housing, and programmed for (i) reading a bar code symbol encoded with a URL specifying the location of an HTML-encoded document stored in an information server connected to the Internet and supporting the TCP/IP standard, and (ii) producing symbol character data representative of said URL;

visual information display means, integrated with said hand-supportable housing, for visually displaying information including graphical information contained in said HTML-encoded document specified by said URL;

Internet accessing means, disposed in said hand-supportable housing and responsive to said bar code symbol reader, said Internet accessing means further including (i) computing means disposed in said hand-supportable housing, and (ii) a GUI-based WWW browser program executed by said computing means, and integrated with said bar code symbol reader in said hand-supportable housing, so that, in response to said bar code symbol reader reading the bar code symbol encoded with said URL, said GUI-based WWW browser program automatically accesses the HTML-encoded document specified by said URL using said TCP/IP standard and the symbol character data representative of said URL, and automatically displays said accessed HTML-encoded document on said visual information display means for review by the operator; and telecommunication means, integrated with said hand-supportable housing and being operably connected to said Internet accessing means, for enabling a two-way telecommunication link between said Internet accessing means and a base-station operably connected to an Internet service provider connected the Internet so as to enable said Internet accessing means to access said HTML-encoded document specified by the URL encoded in said bar code symbol read by said bar code symbol reader.

2. The portable WWW access terminal of claim 1, wherein said bar code symbol reader is a device selected from the group consisting of a laser scanning bar code symbol reader, a CCD bar code symbol reader, and a wand-type bar code symbol reader.

3. The portable WWW access terminal of claim 1, which further comprises information entry means for entering information into said Internet accessing means.

4. The portable WWW access terminal of claim 3, wherein said information entry means comprises a keypad integrated with said hand-supportable housing, for manually entering information into said Internet accessing means.

5. The portable WWW access terminal of claim 1, wherein said visual information display means comprises an LCD panel.

6. The portable WWW access terminal of claim 1, wherein said visual information display means comprises an LCD panel, and said information entry means comprises a touch-sensitive keypad integrated with said LCD panel.

7. The portable WWW access terminal of claim 1, wherein said telecommunication means comprises a modem card for enabling said two-way communication link between said Internet accessing means and said base-station.

8. The portable WWW access terminal of claim 1, wherein said base station is a device selected from the group consisting of a cellular base station operably connected to the Internet, and a satellite-base station operably connected to the Internet.

9. The portable WWW access terminal of claim 1, wherein said bar code symbol encoded within said URL is a one-dimensional bar code symbol, and said bar code symbol reader is programmed to read said one-dimensional bar code symbol.

10. The portable WWW access terminal of claim 1, wherein said bar code symbol encoded within said URL is a two-dimensional bar code symbol, and said bar code symbol reader is programmed to read said two-dimensional bar code symbol.

11. A portable information access terminal for allowing an operator to access and display HTML-encoded documents located on an information network by reading bar code symbols encoded with URLs, said portable information access terminal comprising:

a hand-supportable housing;

a bar code symbol reader, integrated with said hand-supportable housing, and programmed for (i) reading a bar code symbol encoded with a URL specifying the location of an HTML-encoded document stored in an information server connected to said information network and supporting the TCP/IP standard, and (ii) producing symbol character data representative of said URL;

visual information display means, integrated with said hand-supportable housing, for visually displaying information including graphical information contained in said HTML-encoded document specified by said URL;

network accessing means, disposed in said hand-supportable housing and responsive to said bar code symbol reader, said network accessing means further including
(i) computing means disposed in said hand-supportable housing, and
(ii) a GUI-based WWW browser program executed by said computing means, and integrated with said bar code symbol reader in said hand-supportable housing, so that, in response to said bar code symbol reader reading the bar code symbol encoded with said URL, said GUI-based WWW browser program automatically accesses the HTML-encoded document specified by said URL using said TCP/IP standard and the symbol character data representative of said URL, and automatically displays said accessed HTML-encoded document on said visual information display means for review by the operator; and telecommunication means, integrated with said hand-supportable housing and being operably connected to said network accessing means, for enabling a two-way telecommunication link between said Internet accessing means and a base station operably connected to an Internet service provider (ISP) connected to said information network so as to enable said network accessing means to access said HTML-encoded document specified by the URL encoded in said bar code symbol read by said bar code symbol reader.

12. The portable information access terminal of claim 11, wherein said bar code symbol reader is a device selected from the group consisting of a laser scanning bar code symbol reader, a CCD bar code symbol reader, and a wand-type bar code symbol reader.

13. The portable information access terminal of claim 11, which further comprises information entry means for entering information into said network accessing means.

14. The portable information access terminal of claim 13, wherein said information entry means comprises a keypad integrated with said hand-supportable housing, for manually entering information into said network accessing means.

15. The portable information access terminal of claim 11, wherein said visual information display means comprises an LCD panel.

16. The portable information access terminal of claim 11, wherein said visual information display means comprises an LCD panel, and said information entry means comprises a touch-sensitive keypad integrated with said LCD panel.

17. The portable information access terminal of claim 11, wherein said telecommunication means comprises a modem card for enabling said wireless two-way digital communication link between said Internet accessing means and said base-station.

18. The portable information access terminal of claim 11, wherein said base station is a device selected from the group consisting of a cellular base station operably connected to the Internet, and a satellite-base station operably connected to the Internet.

19. The portable WWW access terminal of claim 11, wherein said bar code symbol encoded with said URL is a one-dimensional bar code symbol, and said bar code symbol reader is programmed to read said one-dimensional bar code symbol.

20. The portable WWW access terminal of claim 11, wherein said bar code symbol encoded with said URL is a two-dimensional bar code symbol, and said bar code symbol reader is programmed to read said two-dimensional bar code symbol.

21. An Internet-based information system for allowing an operator to access and display HTML-encoded documents on the WWW by reading bar code symbols encoded with URLs, said Internet-based information system comprising:

(A) an Internet information server connected to the Internet, supporting the TCP/IP standard, and storing a HTML-encoded document at a location on the Internet specified by a URL; and (B) a portable WWW access terminal including
(1) a hand-supportable housing supportable within the hand of said operator;
(2) a bar code symbol reader, integrated with said hand-supportable housing, and programmed for (i) reading a bar code symbol encoded with said URL specifying the location of said HTML-encoded document stored in said Internet information server, and (ii) producing symbol character data representative of said URL;
(3) visual information display means, integrated with said hand-supportable housing, for visually displaying information including graphical information contained in said HTML-encoded document specified by said URL;
(4) Internet accessing means, disposed in said hand-supportable housing and responsive to said bar code symbol reader, said Internet accessing means further including
(i) computing means disposed in said hand-supportable housing, and
(ii) a GUI-based WWW browser program executed by said computing means, and integrated with said bar code symbol reader in said hand-supportable housing, so that, in response to said bar code symbol reader reading the bar code symbol encoded with said URL, said GUI-based WWW browser program automatically accesses from said Internet information server, the HTML-encoded document specified by said URL using said TCP/IP standard and the symbol character data representative of said URL, and automatically displays said accessed HTML-encoded document on said visual information display means of said portable WWW access computer terminal for review by the operator; and
(5) telecommunication means, integrated with said hand-supportable housing and being operably connected to said Internet accessing means, for enabling a two-way telecommunication link between said Internet accessing means and a base-station operably connected to an Internet service provider connected the Internet so as to enable said Internet accessing means to access said HTML-encoded document specified by the URL encoded in said bar code symbol read by said bar code symbol reader.

22. The Internet-based information system of claim 21, wherein said bar code symbol reader is a device selected from the group consisting of a laser scanning bar code symbol reader, a CCD bar code symbol reader, and a wand-type bar code symbol reader.

23. The Internet-based information system of claim 21, wherein said portable WWW access terminal further comprises information entry means for entering information into said Internet accessing means.

24. The Internet-based information system of claim 23, wherein said information entry means comprises a keypad integrated with said hand-supportable housing, for manually entering information into said Internet accessing means.

25. The Internet-based information system of claim 21, wherein said visual information display means comprises an LCD panel.

26. The Internet-based information system of claim 21, wherein said visual information display means comprises an LCD panel, and said information entry means comprises a touch-sensitive keypad integrated with said LCD panel.

27. The Internet-based information system of claim 26, wherein said telecommunication means comprises a modem card for enabling said two-way communication link between said Internet accessing means and said base-station.

28. The Internet-based information system of claim 21, wherein said base station is a device selected from the group consisting of a cellular base station operably connected to the Internet, and a satellite-base station operably connected to the Internet.

29. The Internet-based information system of claim 21, wherein saidbar code symbol encoded with said URL is a one-dimensional bar code symbol, and said bar code symbol reader is programmed to read said one-dimensional bar code symbol.

30. The Internet-based information system of claim 21, wherein said bar code symbol encoded with said URL is a two-dimensional bar code symbol, and said bar code symbol reader is programmed to read said two-dimensional bar code symbol.

* * * * *